(12) United States Patent
Nomoto et al.

(10) Patent No.: US 12,037,768 B2
(45) Date of Patent: Jul. 16, 2024

(54) WORK VEHICLE

(71) Applicant: KOMATSU LTD., Tokyo (JP)

(72) Inventors: Masayoshi Nomoto, Tokyo (JP); Makoto Sasaki, Tokyo (JP); Hiroaki Tanaka, Tokyo (JP); Takeshi Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 276 days.

(21) Appl. No.: 17/613,153

(22) PCT Filed: Jun. 18, 2020

(86) PCT No.: PCT/JP2020/023908
§ 371 (c)(1),
(2) Date: Nov. 22, 2021

(87) PCT Pub. No.: WO2020/256051
PCT Pub. Date: Dec. 24, 2020

(65) Prior Publication Data
US 2022/0220700 A1 Jul. 14, 2022

(30) Foreign Application Priority Data

Jun. 19, 2019 (JP) .................................. 2019-113949

(51) Int. Cl.
*E02F 9/16* (2006.01)
*E02F 9/12* (2006.01)

(52) U.S. Cl.
CPC .............. *E02F 9/163* (2013.01); *E02F 9/121* (2013.01)

(58) Field of Classification Search
CPC ... B60R 21/13; B60R 21/131; B62D 33/0604; B62D 33/0617; E02F 9/163; E02F 9/166
USPC ................................ 296/35.1, 190.07, 190.08
See application file for complete search history.

(56) References Cited

U.S. PATENT DOCUMENTS

| 6,810,980 B2 * | 11/2004 | Jo ...................... B62D 33/0617 180/89.13 |
| 7,677,627 B2 * | 3/2010 | Aoyama ............ B62D 33/0617 296/1.03 |
| 10,099,728 B2 * | 10/2018 | Shinohara .......... B62D 33/0604 |
| 2006/0071499 A1 * | 4/2006 | Yoon .................. B62D 33/0604 296/35.1 |

(Continued)

FOREIGN PATENT DOCUMENTS

| CN | 1704534 A | 12/2005 |
| EP | 2980321 A1 | 2/2016 |

(Continued)

*Primary Examiner* — Jason S Daniels
(74) *Attorney, Agent, or Firm* — Faegre Drinker Biddle & Reath LLP

(57) ABSTRACT

A hydraulic excavator as a work vehicle includes: a revolving frame; and a cab. The cab includes: a floor member that faces the revolving frame, with a gap therebetween; a support base provided on the floor member and supporting an operator's seat; a pillar member connected to a left end of the floor member; and a reinforcing member connected to the pillar member and the support base. The hydraulic excavator further includes a restriction member provided in the gap and protruding from the floor member toward the revolving frame. The restriction member has a protrusion length shorter than a length of the gap in an up-down direction, and is provided below the support base.

4 Claims, 13 Drawing Sheets

(56) References Cited

U.S. PATENT DOCUMENTS

| | | |
|---|---|---|
| 2007/0018484 A1 | 1/2007 | Lee |
| 2007/0187991 A1 | 8/2007 | Mori |
| 2011/0135434 A1 | 6/2011 | Yoon |
| 2016/0031494 A1* | 2/2016 | Kinoshita .......... B62D 33/0604 |
| | | 296/190.07 |
| 2017/0009425 A1* | 1/2017 | Tajima ................... E02F 9/166 |
| 2019/0382981 A1* | 12/2019 | Lee ........................ E02F 9/163 |

FOREIGN PATENT DOCUMENTS

| | | |
|---|---|---|
| JP | H10-266267 A | 10/1998 |
| JP | 2001-055176 A | 2/2001 |
| JP | 2007-030866 A | 2/2007 |
| JP | 2010-095999 A | 4/2010 |
| JP | 2012-082595 A | 4/2012 |
| JP | 2016-151093 A | 8/2016 |
| KR | 10-2006-0049486 A | 5/2006 |
| KR | 2007-0020558 A | 2/2007 |
| WO | WO 2018/160006 A1 | 9/2018 |

\* cited by examiner

WORK VEHICLE

TECHNICAL FIELD

The present disclosure relates to a work vehicle.

BACKGROUND ART

For example, Japanese Patent Laying-Open No. 2010-95999 (PTL 1) discloses a hydraulic excavator including a revolving frame and a cab provided on the revolving frame and delimiting an operator's cab.

CITATION LIST

Patent Literature

PTL 1: Japanese Patent Laying-Open No. 2010-95999

SUMMARY OF INVENTION

Technical Problem

Since the hydraulic excavator disclosed in PTL 1 above may in some cases perform operations on a rough terrain or an inclined terrain, it is expected that the hydraulic excavator may fall down in such an area due to erroneous operation by an operator. When the hydraulic excavator falls down and excessive external force is applied to the cab, the cab may become deformed, which may cause restrictions on a living space for the operator.

Accordingly, an object of the present disclosure is to provide a work vehicle in which a cab is not excessively deformed when excessive external force is applied to the cab.

Solution to Problem

A work vehicle according to the present disclosure includes: a revolving frame; and a cab. The cab is provided on the revolving frame. The cab includes: a floor member; a support base; a first pillar member; and a reinforcing member. The floor member faces the revolving frame in an up-down direction, with a gap therebetween.

The support base is provided on the floor member. The support base supports an operator's seat. The first pillar member extends in the up-down direction. The first pillar member is connected to one end of the floor member in a left-right direction. The reinforcing member is provided on the floor member. The reinforcing member is connected to the first pillar member and the support base. The work vehicle further includes a restriction member. The restriction member is provided in the gap. The restriction member protrudes from one of the revolving frame and the floor member toward the other of the revolving frame and the floor member. The restriction member has a protrusion length shorter than a length of the gap in the up-down direction. The restriction member is provided below the support base or the reinforcing member.

Advantageous Effects of Invention

According to the present disclosure, there can be provided a work vehicle in which a cab is not excessively deformed when excessive external force is applied to the cab.

DESCRIPTION OF EMBODIMENTS

Figure 1:
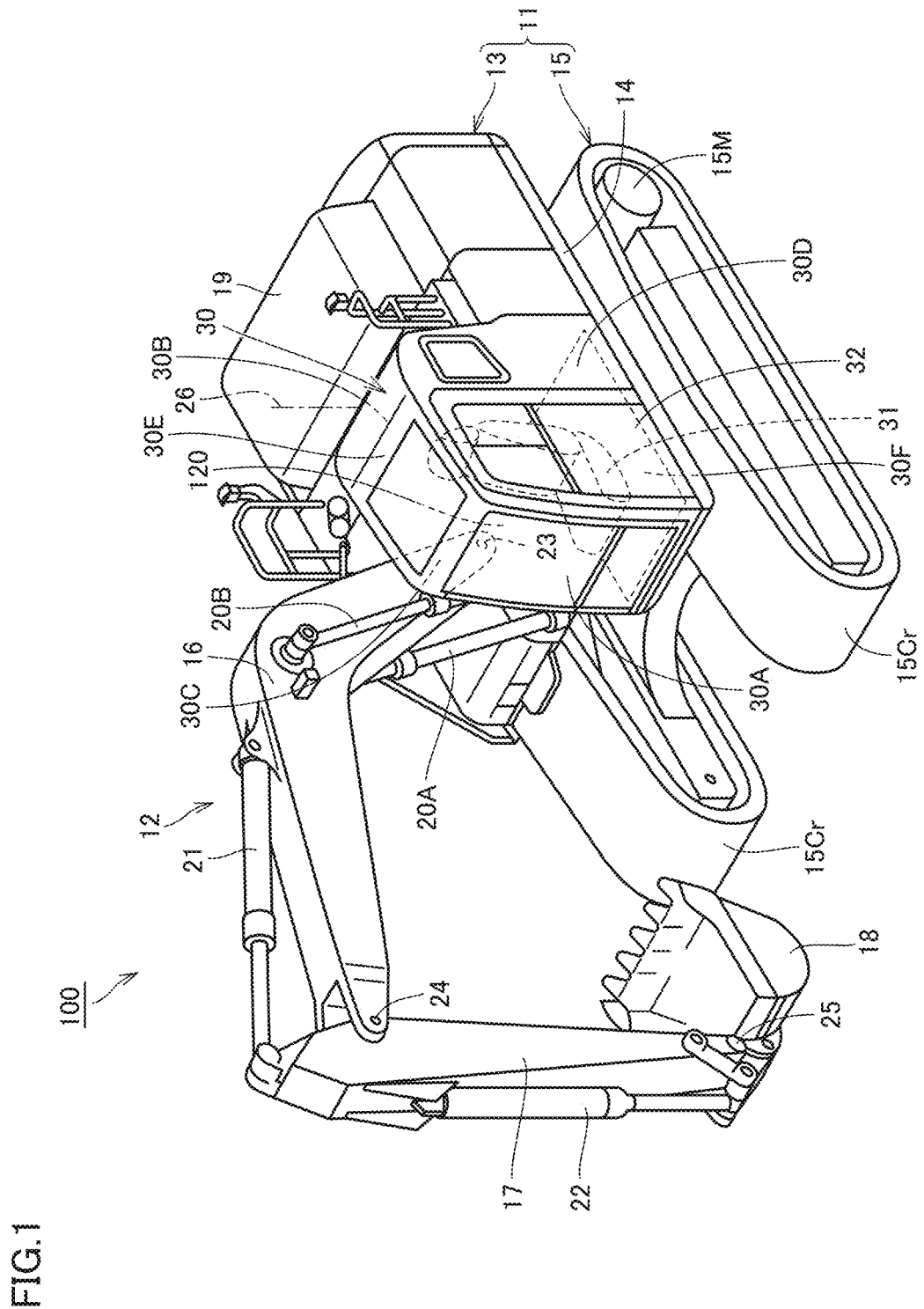
FIG. 1 is a perspective view showing a hydraulic excavator according to the present embodiment.

An embodiment of the present disclosure will be described with reference to the drawings. In the drawings referenced below, the same or corresponding components are denoted by the same reference numerals.

FIG. 1 is a perspective view showing a hydraulic excavator according to the present embodiment. First, an overall structure of the hydraulic excavator will be described.

As shown in FIG. 1, a hydraulic excavator 100 includes a vehicular body 11 and a work implement 12. Vehicular body 11 includes a revolving unit 13 and a traveling unit 15.

Traveling unit 15 includes a pair of crawler belts 15Cr and a travel motor 15M. Hydraulic excavator 100 can travel by rotation of crawler belts 15Cr. Travel motor 15M is provided as a drive source of traveling unit 15. Traveling unit 15 may include a wheel (tire).

Revolving unit 13 is provided on traveling unit 15. Revolving unit 13 can swing about the center of swing 26 with respect to traveling unit 15. The center of swing 26 corresponds to an axis extending in the up-down direction. Revolving unit 13 includes a cab (operator's cab) 30. A living space 120 for an operator is formed in cab 30. An operator's seat 31 is provided in living space 120 for the operator. The operator rides in living space 120 and is seated on operator's seat 31 to operate hydraulic excavator 100.

Revolving unit 13 includes an engine compartment 19 and a counter weight that is provided in a rear portion of revolving unit 13. Engine compartment 19 accommodates an engine, a hydraulic oil tank, an air cleaner, a hydraulic pump, and the like.

Work implement 12 is attached to vehicular body 11. Work implement 12 is attached to revolving unit 13. Work implement 12 performs operations such as excavation of soil. Work implement 12 includes a boom 16, an arm 17, and a bucket 18.

Boom 16 is pivotably coupled to vehicular body 11 (revolving unit 13) through a boom pin 23. Arm 17 is pivotably coupled to boom 16 through an arm pin 24. Bucket 18 is pivotably coupled to arm 17 through a bucket pin 25.

Work implement 12 further includes boom cylinders 20A and 20B, an arm cylinder 21, and a bucket cylinder 22.

Boom cylinders 20A and 20B, arm cylinder 21, and bucket cylinder 22 each are a hydraulic cylinder driven by hydraulic oil. Boom cylinders 20A and 20B, which are provided as one pair, each are provided on a corresponding one of both sides of boom 16, and operate boom 16 to pivot. Arm cylinder 21 operates arm 17 to pivot. Bucket cylinder 22 operates bucket 18 to pivot.

Herein, the front-rear direction refers to a front direction and a rear direction of the operator seated on operator's seat 31. The direction facing the operator seated on operator's seat 31 is defined as the front direction, and the direction backward the operator seated on operator's seat 31 is defined as the rear direction. The left-right (lateral) direction refers to a left direction and a right direction of the operator seated on operator's seat 31. When the operator seated on operator's seat 31 faces the front, the right side of the operator is defined as the right direction. When the operator seated on operator's seat 31 faces the front, the left side of the operator is defined as the left direction. The up-down direction refers to a direction orthogonal to a plane including the front-rear direction and the left-right direction. The side downward the ground is defined as a lower side, and the side upward the sky is defined as an upper side.

Figure 2:
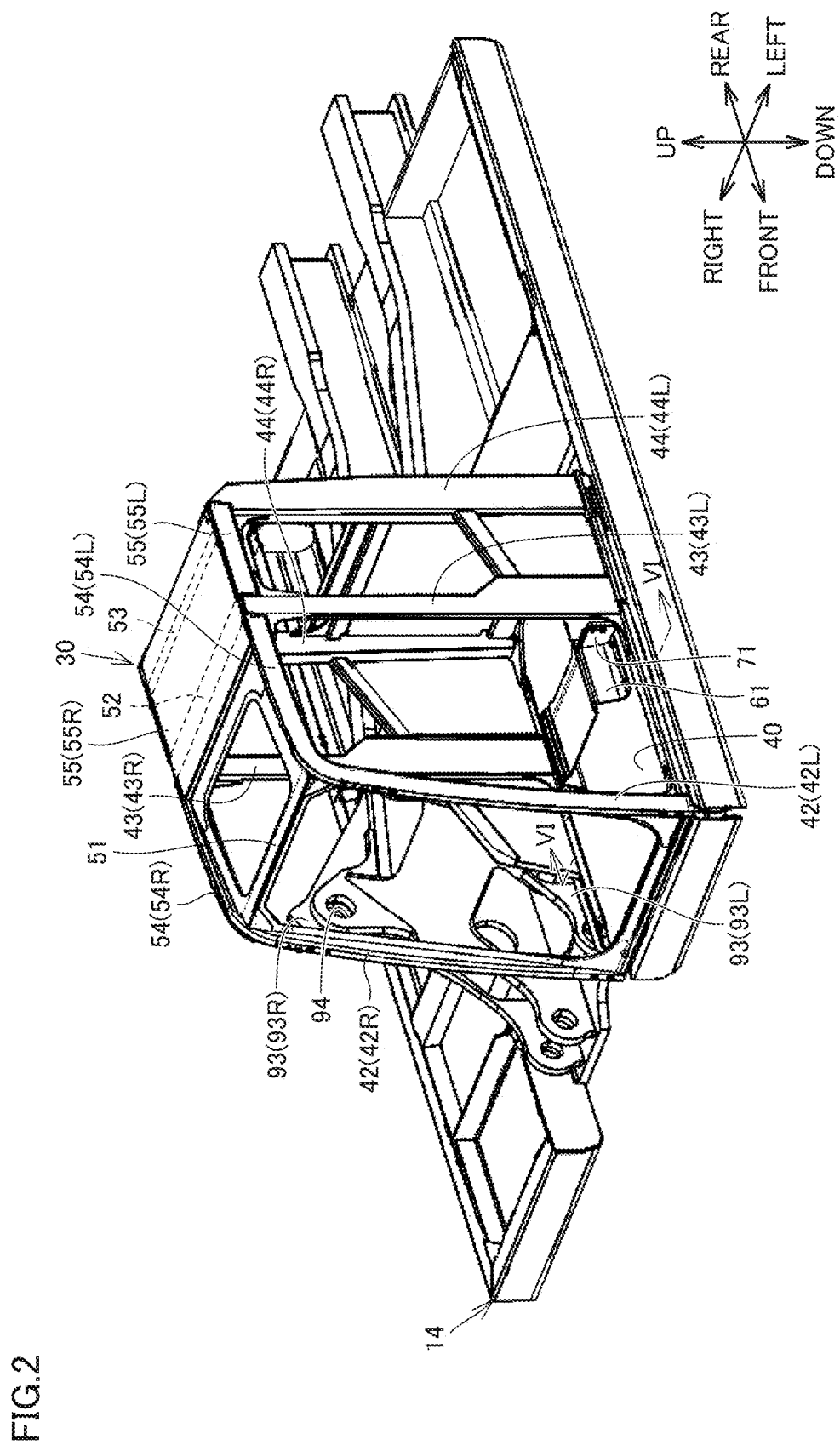
FIG. 2 is a perspective view showing a cab and a revolving frame.
Figure 3:
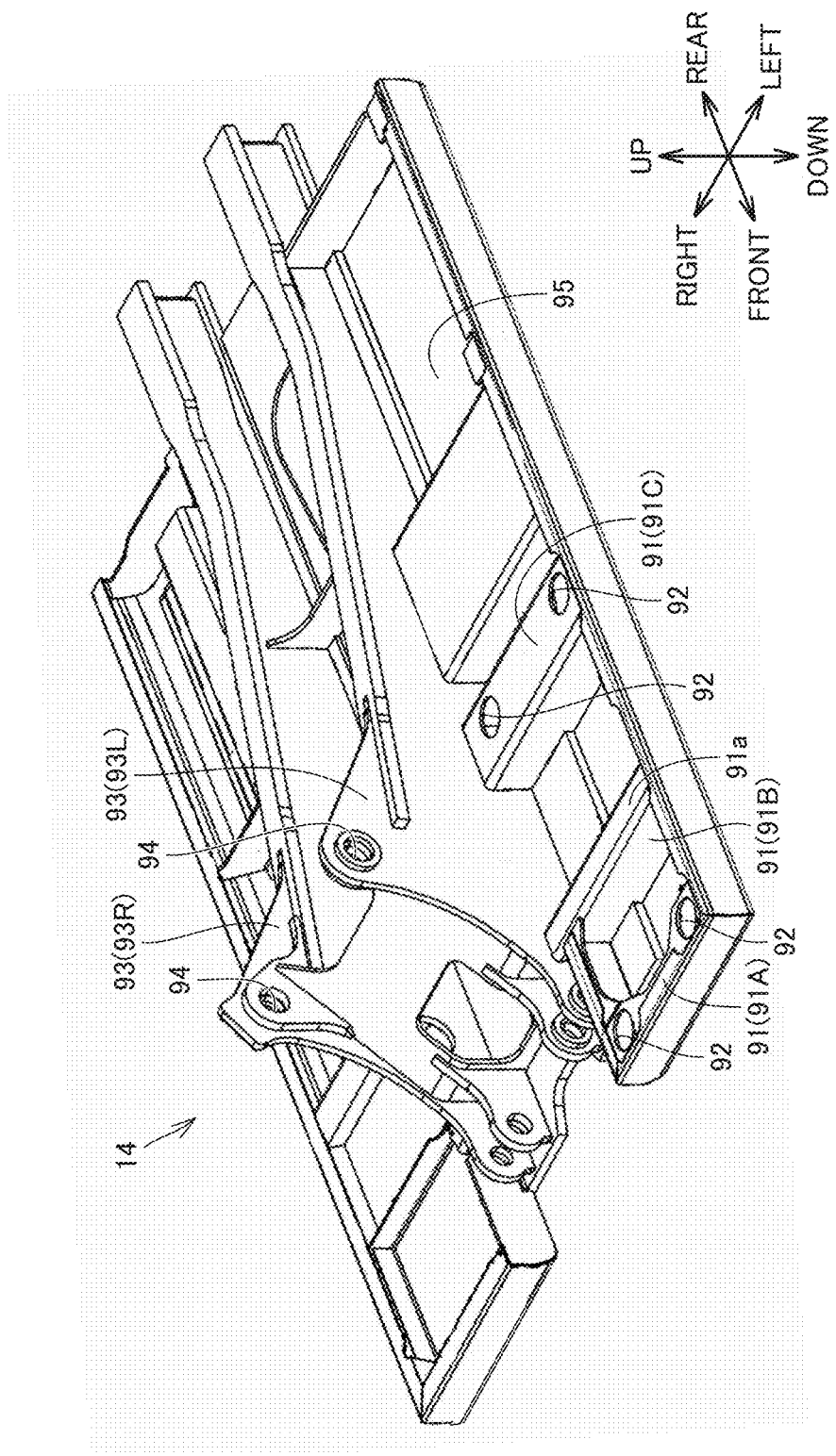
FIG. 3 is a perspective view showing the revolving frame.

FIG. 2 is a perspective view showing the cab and a revolving frame. FIG. 3 is a perspective view showing the revolving frame.

As shown in FIGS. 1 to 3, revolving unit 13 further includes a revolving frame 14. Revolving frame 14 is a frame unit that forms a base of revolving unit 13, and is provided directly on traveling unit 15. Cab 30, engine compartment 19 and the like are mounted on revolving frame 14. Work implement 12 is attached to revolving frame 14.

As shown in FIG. 3, revolving frame 14 includes a bottom plate 95, a pair of left and right vertical plates 93 (93L and 93R), and a plurality of rib portions 91 (91A, 91B and 91C).

Bottom plate 95 is formed of a plate member extending in a horizontal direction. Vertical plates 93 are erected on bottom plate 95. Each of vertical plates 93 is formed of a plate member that is orthogonal to the left-right direction. Vertical plate 93L and vertical plate 93R are spaced apart from each other and face each other in the left-right direction. Boom 16 in FIG. 1 is arranged between vertical plate 93L and vertical plate 93R. Each of vertical plates 93 is provided with a pin hole 94 into which boom pin 23 in FIG. 1 is inserted.

Rib portions 91 are provided on bottom plate 95. Rib portions 91 extend in the left-right direction. Each of rib portions 91 has a rib shape in which the front-rear direction corresponds to a width direction, the left-right direction corresponds to a longitudinal direction, and the up-down direction corresponds to a height direction. The plurality of rib portions 91 are provided on the left side of vertical plate 93L. Rib portion 91A, rib portion 91B and rib portion 91C are aligned from the front side to the rear side in the listed order. Rib portion 91A and rib portion 91C are provided with damper attachment holes 92 to which front dampers 96 (96L and 96R) and rear dampers 97 (97L and 97R) described below are attached, respectively.

As shown in FIGS. 2 and 3, cab 30 is provided on the left side of vertical plate 93L. Cab 30 is provided above the plurality of rib portions 91.

Figure 4:
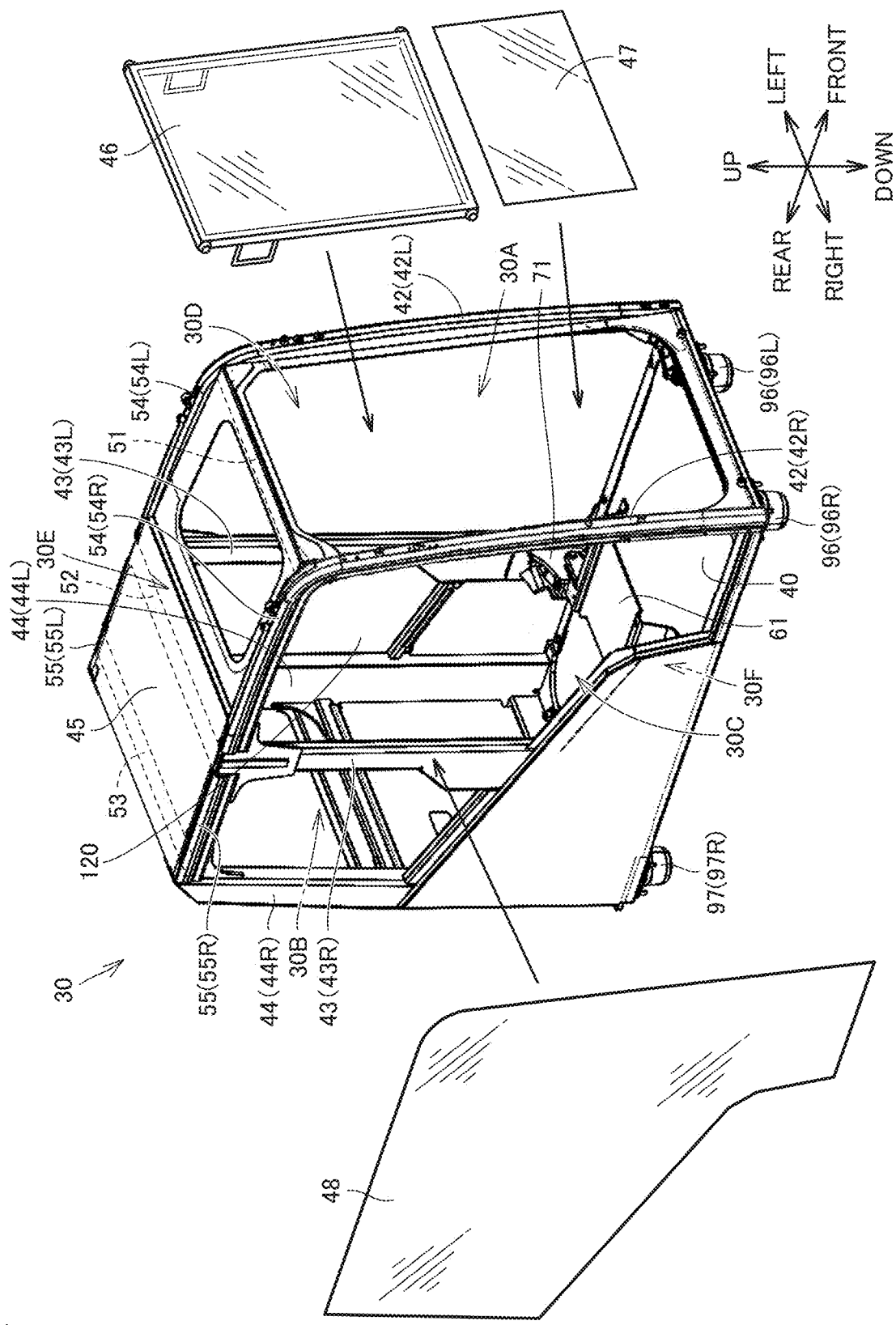
FIG. 4 is a perspective view showing the cab.
Figure 5:
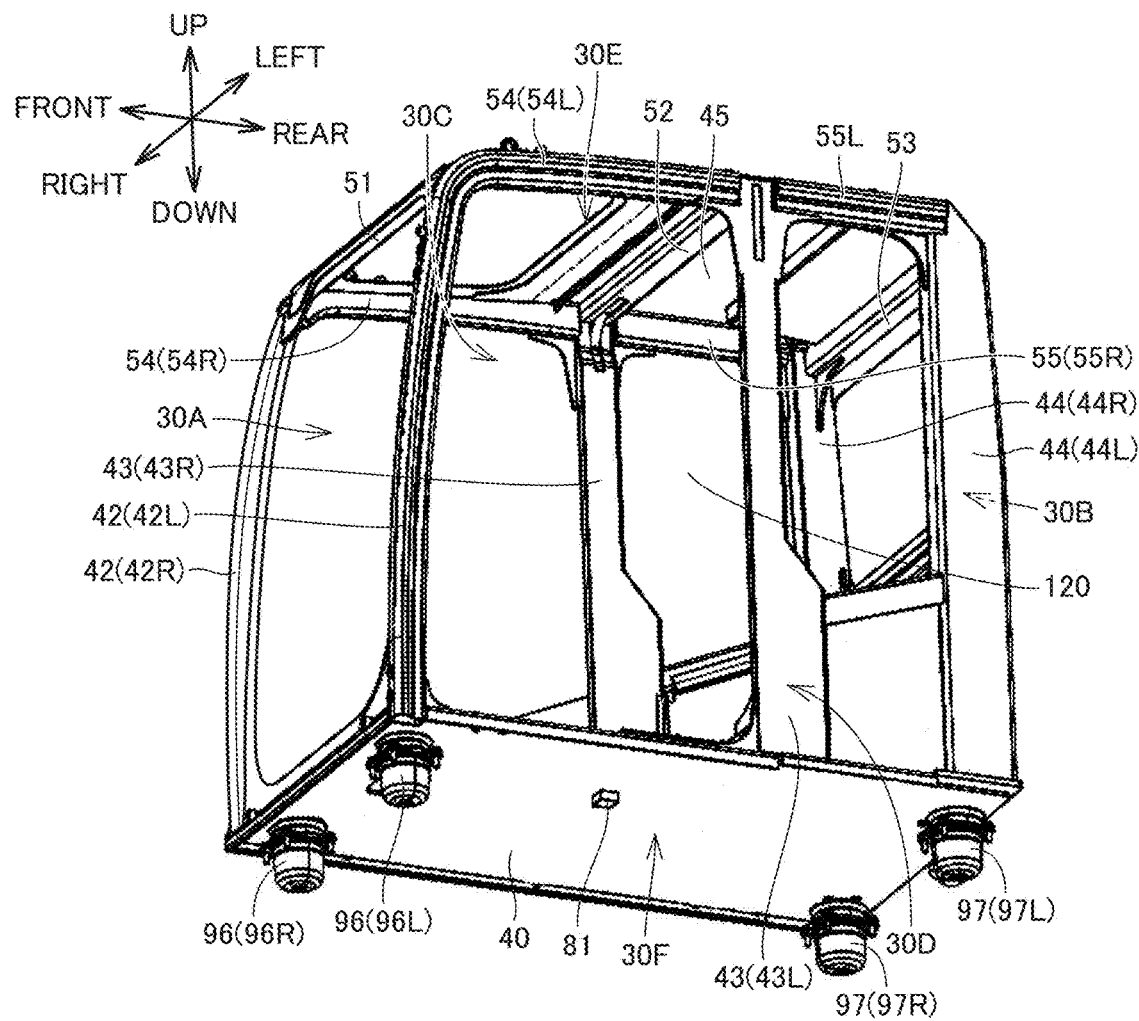
FIG. 5 is another perspective view showing the cab.

FIGS. 4 and 5 are perspective views showing the cab. As shown in FIGS. 4 and 5, cab 30 is formed of a box having a rectangular parallelepiped shape and including a front surface 30A, a rear surface 30B, a right surface 30C, a left surface 30D, a top surface 30E, and a bottom surface 30F.

Front surface 30A is provided to face the front side. Rear surface 30B is provided to face the rear side. Right surface 30C is provided to face the right side. Right surface 30C faces work implement 12 shown in FIG. 1 in the left-right direction. Left surface 30D is provided to face the left side. Top surface 30E is provided to face the upper side. Bottom surface 30F is provided to face the lower side. Bottom surface 30F faces revolving frame 14 in FIG. 2 in the up-down direction.

Cab 30 includes a floor member 40, a pair of left and right pillar members 42 (42L and 42R), a pair of left and right pillar members 43 (43L and 43R), a pair of left and right pillar members 44 (44L and 44R), beam members 51, 52 and 53, a pair of left and right girder members 54 (54L and 54R), and a pair of left and right girder members 55 (55L and 55R).

Floor member 40, pillar members 42, pillar members 43, pillar members 44, beam members 51, 52 and 53, girder members 54, and girder members 55 are integrally formed with each other by welding, to thereby form a cab frame.

Floor member 40 is provided on bottom surface 30F. Floor member 40 is formed of a plate member (e.g., a steel plate).

Each of pillar members 42, pillar members 43, pillar members 44, beam members 51, 52 and 53, girder members 54, and girder members 55 is formed of a frame member extending in one direction in an elongated manner. Pillar members 42, pillar members 43, pillar members 44, beam members 51, 52 and 53, girder members 54, and girder members 55 are provided around living space 120 for the operator. Living space 120 for the operator is provided at a position surrounded by pillar members 42, pillar members 43, pillar members 44, beam members 51, 52 and 53, girder members 54, and girder members 55.

Pillar members 42, pillar members 43 and pillar members 44 are erected on floor member 40. Pillar members 42, pillar members 43 and pillar members 44 are connected to floor member 40. Pillar members 42, pillar members 43 and pillar members 44 extend in the up-down direction between top surface 30E and bottom surface 30F.

Pillar member 42L and pillar member 42R are arranged to be spaced apart from each other in the left-right direction. Pillar member 42L and pillar member 42R are located to face each other in the left-right direction. Pillar member 42L is provided at a corner portion where front surface 30A and left surface 30D intersect with each other. Pillar member 42L is provided at a front end of left surface 30D. Pillar member 42R is provided at a front end of right surface 30C. Pillar member 42L and pillar member 42R are provided on the front side of operator's seat 31 shown in FIG. 1.

Pillar member 43L and pillar member 43R are arranged to be spaced apart from each other in the left-right direction. Pillar member 43L and pillar member 43R are located to face each other in the left-right direction. Pillar member 43L and pillar member 43R are provided on the lateral sides of operator's seat 31 shown in FIG. 1. Pillar member 43L is provided on left surface 30D. Pillar member 43R is provided on right surface 30C. Pillar member 43L and pillar member 43R are provided on the rear side of pillar member 42L and pillar member 42R.

Pillar member 44L and pillar member 44R are arranged to be spaced apart from each other in the left-right direction. Pillar member 44L and pillar member 44R are located to face each other in the left-right direction. Pillar member 44L is provided at a corner portion where left surface 30D and rear surface 30B intersect with each other. Pillar member 44L is provided at a rear end of left surface 30D. Pillar member 44R is provided at a corner portion where right surface 30C and rear surface 30B intersect with each other. Pillar member 44R is provided at a rear end of right surface 30C. Pillar member 44L and pillar member 44R are provided on the rear side of pillar member 43L and pillar member 43R. Pillar member 44L and pillar member 44R are provided on the rear side of operator's seat 31 shown in FIG. 1.

Beam members 51, 52 and 53, girder members 54 and girder members 55 are provided on top surface 30E. Beam member 51, beam member 52 and beam member 53 extend in the left-right direction. Girder members 54 and girder members 55 extend in the front-rear direction.

Beam member 51 is provided at a corner portion where front surface 30A and top surface 30E intersect with each other. A left end of beam member 51 is connected to a connection portion that connects pillar member 42L and below-described girder member 54L. A right end of beam member 51 is connected to a connection portion that connects pillar member 42R and below-described girder member 54R.

Beam member 52 is provided on the rear side of beam member 51. A right end of beam member 52 is connected to an upper end of pillar member 43R. A left end of beam member 52 is connected to an upper end of pillar member 43L.

Beam member 53 is provided at a corner portion where top surface 30E and rear surface 30B intersect with each other. Beam member 53 is provided on the rear side of beam member 52. A right end of beam member 53 is connected to an upper end of pillar member 44R. A left end of beam member 53 is connected to an upper end of pillar member 44L.

Girder member 54L and girder member 54R are arranged to be spaced apart from each other in the left-right direction. Girder member 54L and girder member 54R are located to face each other in the left-right direction.

Girder member 54L is provided at a corner portion where left surface 30D and top surface 30E intersect with each other. A front end of girder member 54L is connected to an upper end of pillar member 42L. Girder member 54L and pillar member 42L are formed of an integrated frame member. A rear end of girder member 54L is connected to an upper end of pillar member 43L. Girder member 54R is provided at a corner portion where right surface 30C and top surface 30E intersect with each other. A front end of girder member 54R is connected to an upper end of pillar member 42R. Girder member 54R and pillar member 42R are formed of an integrated frame member. A rear end of girder member 54R is connected to an upper end of pillar member 43R.

Girder member 55L and girder member 55R are arranged to be spaced apart from each other in the left-right direction. Girder member 55L and girder member 55R are located to face each other in the left-right direction.

Girder member 55L is provided at a corner portion where left surface 30D and top surface 30E intersect with each other. A front end of girder member 55L is connected to an upper end of pillar member 43L. A rear end of girder member 55R is connected to an upper end of pillar member 44L. Girder member 55R is provided at a corner portion where right surface 30C and top surface 30E intersect with each other. A front end of girder member 55R is connected to an upper end of pillar member 43R. A rear end of girder member 55L is connected to an upper end of pillar member 44R.

As shown in FIGS. 1 and 4, cab 30 further includes a ceiling member 45 and a door member 32. Ceiling member 45 is provided on top surface 30E. Ceiling member 45 is formed of a plate member (e.g., a steel plate). Ceiling member 45 is provided on beam members 51, 52 and 53, girder members 54, and girder members 55.

Door member 32 is provided on left surface 30D so as to be openable and closable. Door member 32 is opened and closed when the operator enters and leaves living space 120.

As shown in FIG. 4, cab 30 further includes a front transparent member 46, a lower transparent member 47 and a lateral transparent member 48. Each of front transparent member 46, lower transparent member 47 and lateral transparent member 48 is formed of a transparent member that allows light to transmit therethrough. Each of front transparent member 46, lower transparent member 47 and lateral transparent member 48 is formed of, for example, glass or acryl.

Front transparent member 46 and lower transparent member 47 are provided on front surface 30A. Front transparent member 46 and lower transparent member 47 are provided between pillar member 42L and pillar member 42R in the left-right direction. Front transparent member 46 and lower transparent member 47 are provided on the front side of pillar members 43. Front transparent member 46 and lower transparent member 47 are provided on the front side of operator's seat 31. Front transparent member 46 is provided on the upper side of lower transparent member 47.

Lateral transparent member 48 is provided on right surface 30C. Lateral transparent member 48 is provided across pillar member 42R, pillar member 43R and pillar member 44R in the front-rear direction. Lateral transparent member 48 may be provided only across pillar member 42R and pillar member 43R in the front-rear direction.

Lower transparent member 47 and lateral transparent member 48 are of fixed type, whereas front transparent member 46 is of movable type that allows front transparent member 46 to be opened and closed. Front transparent member 46 is opened and closed between a position where front surface 30A enters an open state and a position where front surface 30A enters a closed state. When front transparent member 46 is operated to the position where front surface 30A enters the open state, front transparent member 46 moves to top surface 30E.

Figure 6:
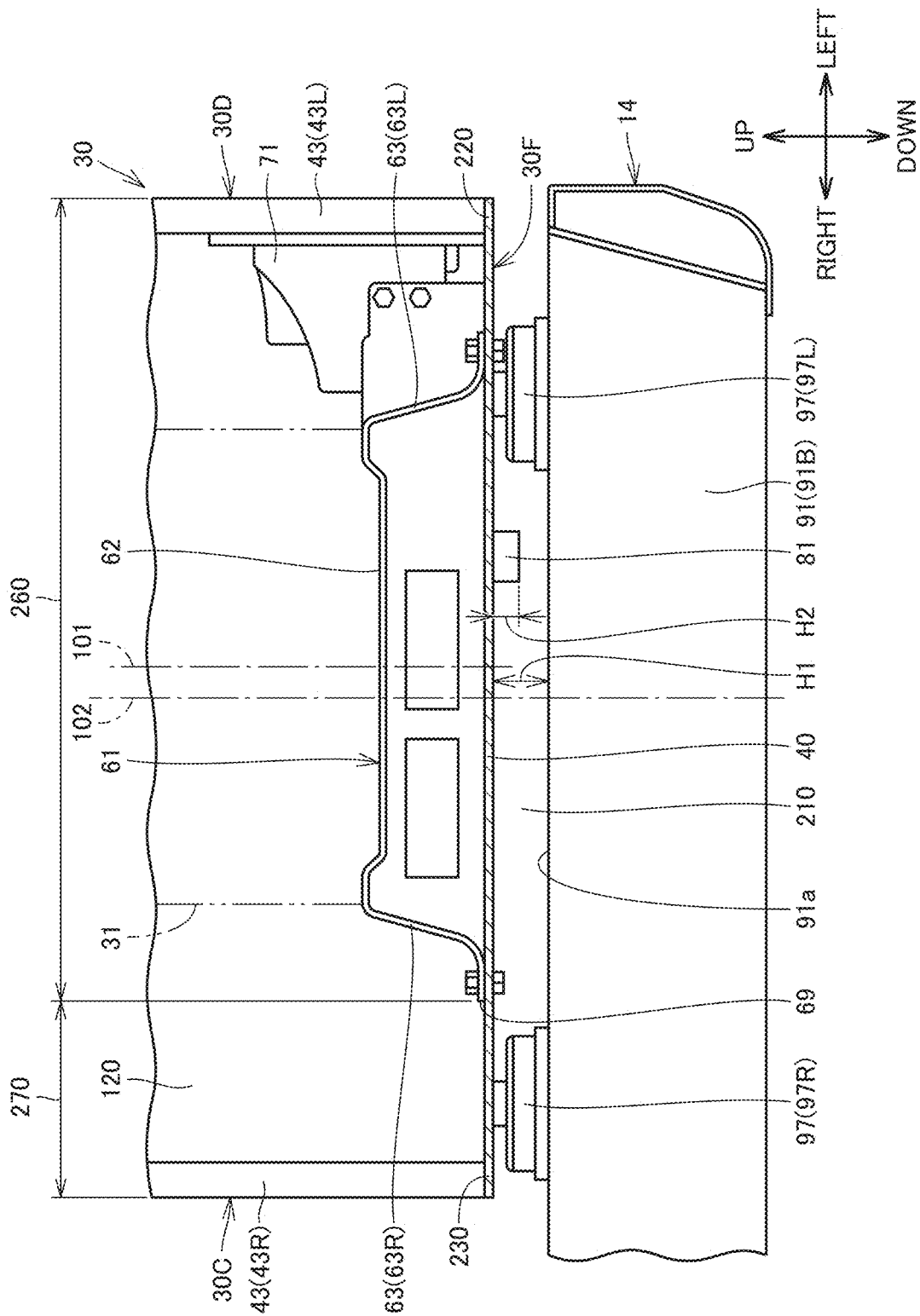
FIG. 6 is a cross-sectional view partially showing the hydraulic excavator when seen in a direction indicated by an arrow line VI-VI in FIG. 2.

FIG. 6 is a cross-sectional view partially showing the hydraulic excavator when seen in a direction indicated by an arrow line VI-VI in FIG. 2. FIG. 6 shows a center position 101 of operator's seat 31 in the left-right direction, and a center position 102 of cab 30 in the left-right direction.

As shown in FIGS. 2 to 6, hydraulic excavator 100 further includes a pair of left and right front dampers 96 (96L and 96R) and a pair of left and right rear dampers 97 (97L and 97R). Front dampers 96 and rear dampers 97 are interposed between cab 30 (floor member 40) and revolving frame 14 (rib portion 91A and rib portion 91C) in the up-down direction. Front dampers 96 and rear dampers 97 elastically support cab 30.

Front dampers 96 are provided at a front end of cab 30. Front damper 96L and front damper 96R are arranged to be spaced apart from each other in the left-right direction. Rear dampers 97 are provided at a rear end of cab 30. Rear damper 97L and rear damper 97R are arranged to be spaced apart from each other in the left-right direction. In a top view, front damper 96L, front damper 96R, rear damper 97L, and rear damper 97R are provided at four corners of cab 30.

Front dampers 96 are attached to floor member 40 and rib portion 91A. Rear dampers 97 are attached to floor member 40 and rib portion 91C. Rib portion 91B is provided between front dampers 96 and rear dampers 97 in the front-rear direction.

Floor member 40 faces revolving frame 14 in the up-down direction, with a gap 210 therebetween. Floor member 40 faces rib portions 91 (91A, 91B and 91C) in the up-down direction, with gap 210 therebetween.

Figure 7:
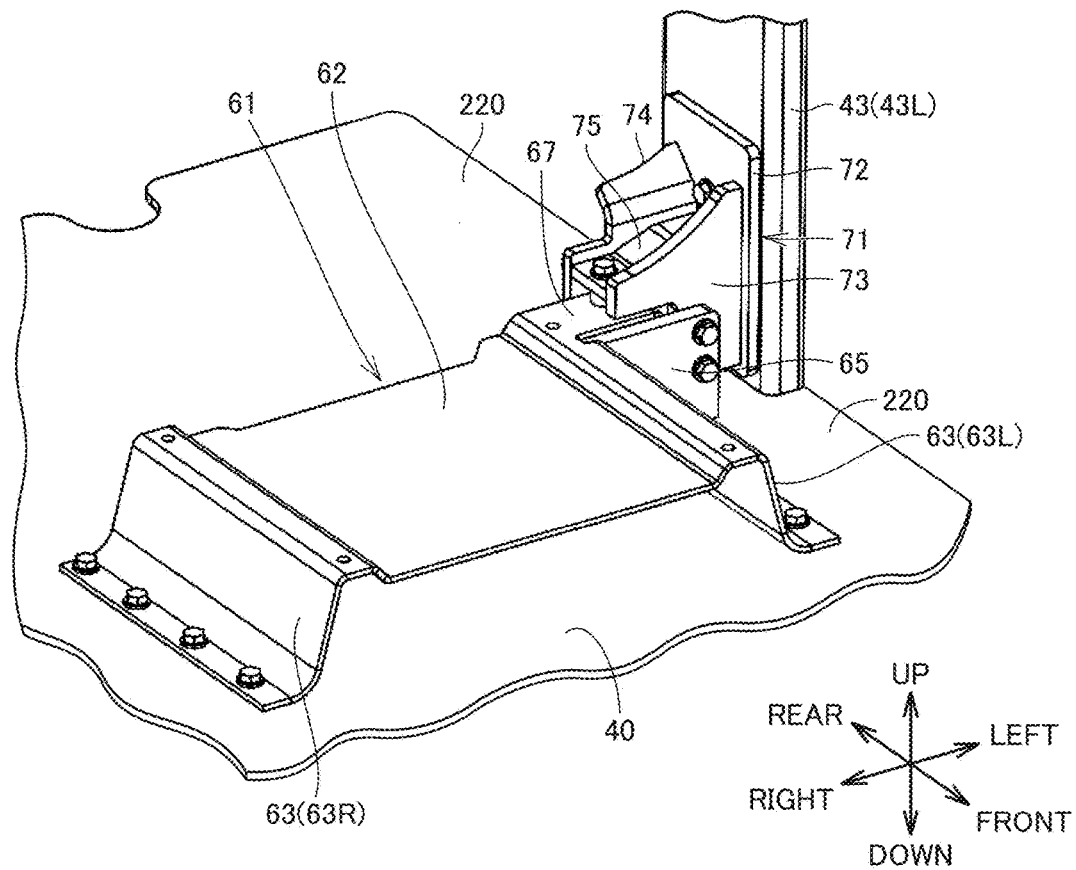
FIG. 7 is a perspective view partially showing the interior of the cab in FIG. 4.
Figure 8:
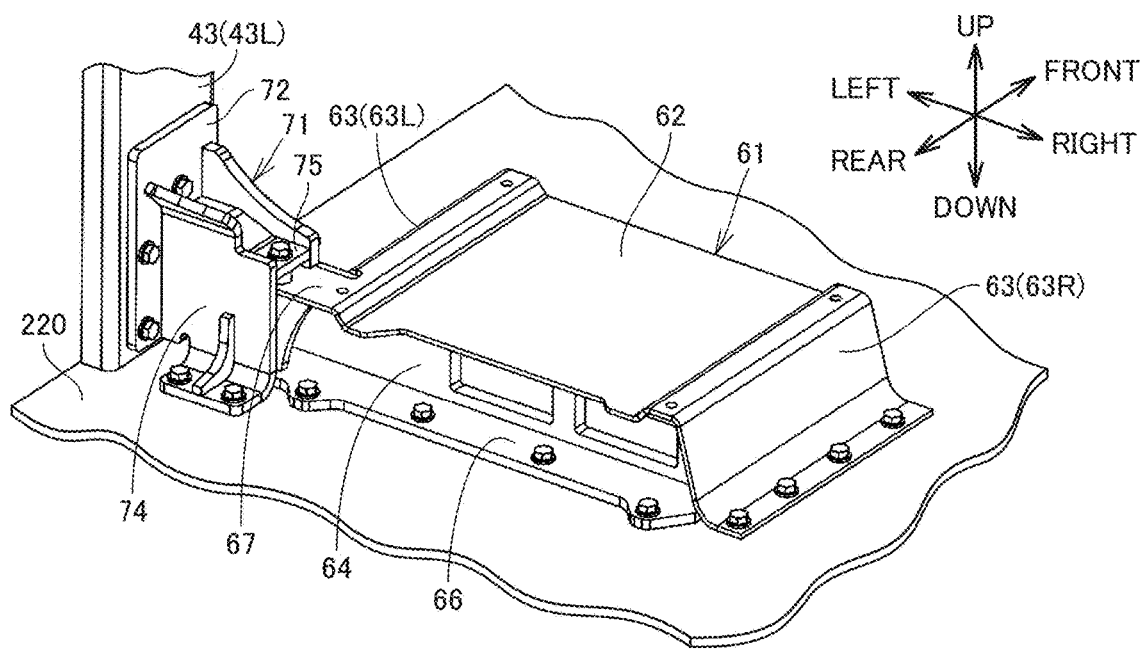
FIG. 8 is another perspective view partially showing the interior of the cab in FIG. 4.

FIGS. 7 and 8 are perspective views partially showing the interior of the cab in FIG. 4. As shown in FIGS. 6 to 8, pillar member 43L is connected to a left end 220 of floor member 40. Pillar member 43R is connected to a right end 230 of floor member 40.

Cab 30 further includes a support base 61 and a reinforcing member 71. Support base 61 and reinforcing member 71 are provided in living space 120 for the operator. Support base 61 and reinforcing member 71 are provided on floor member 40.

Support base 61 is provided at a position distant from left end 220 of floor member 40 in the left-right direction. Support base 61 is provided at a position distant from right end 230 of floor member 40 in the left-right direction. Support base 61 is provided on both of the left side and the right side, with center position 101 of operator's seat 31 interposed therebetween. Support base 61 is provided on both of the left side and the right side, with center position 102 of cab 30 interposed therebetween.

Support base 61 is connected to floor member 40. Support base 61 is fastened to floor member 40 by a bolt. Operator's seat 31 is provided at a position distant from and above floor member 40. Operator's seat 31 is supported by support base 61. Operator's seat 31 is provided on support base 61.

Reinforcing member 71 is provided between pillar member 43L and support base 61 in the left-right direction. Reinforcing member 71 is provided at a position close to left end 220 of floor member 40 relative to center position 101 of operator's seat 31 in the left-right direction. Reinforcing member 71 is provided at a position close to left end 220 of floor member 40 relative to center position 102 of cab 30 in the left-right direction.

Reinforcing member 71 is connected to pillar member 43L and support base 61. Reinforcing member 71 is fastened to pillar member 43L and support base 61 by a bolt. Reinforcing member 71 is connected to floor member 40. Reinforcing member 71 is fastened to floor member 40 by a bolt.

Figure 9:
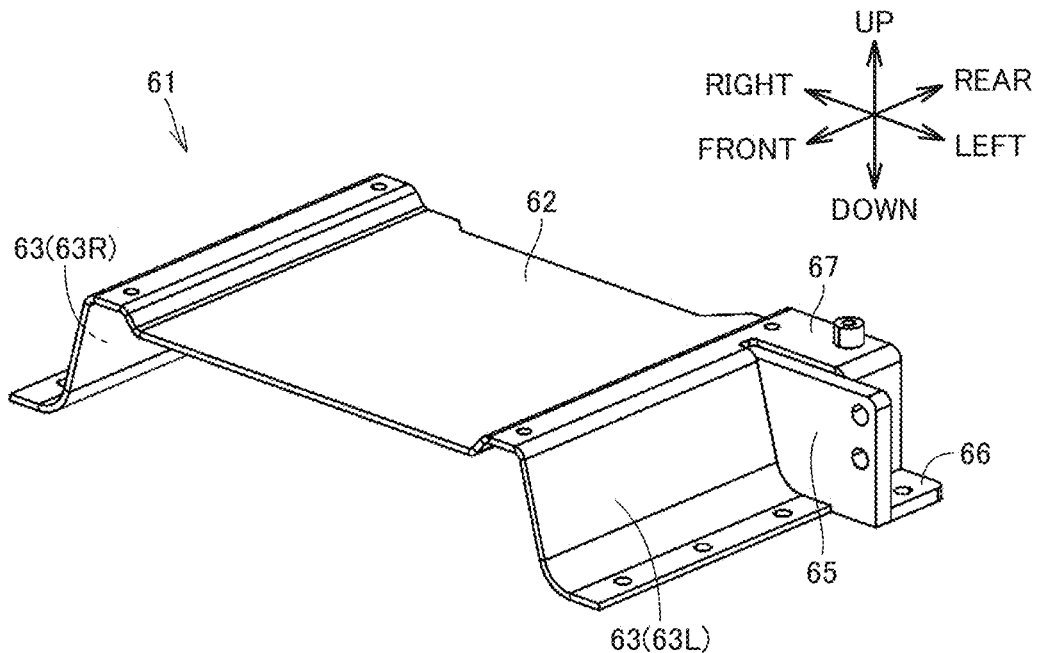
FIG. 9 is a perspective view showing a support base in FIGS. 7 and 8.
Figure 10:
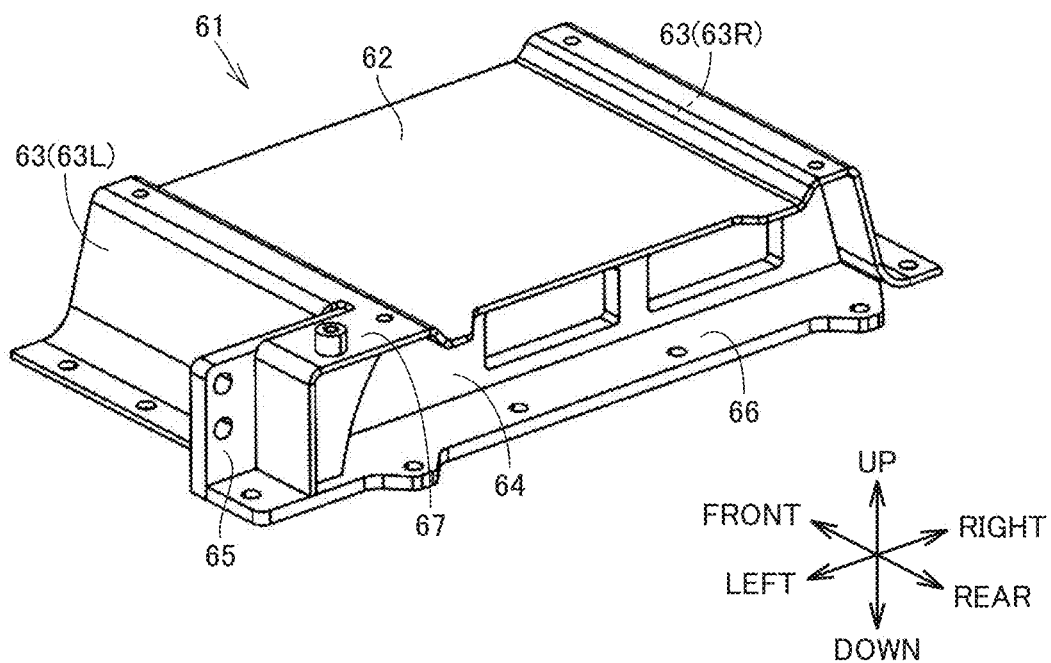
FIG. 10 is another perspective view showing the support base in FIGS. 7 and 8.

FIGS. 9 and 10 are perspective views showing the support base in FIGS. 7 and 8. As shown in FIGS. 7 to 10, support base 61 is formed of metal (e.g., a steel material). Support base 61 includes a pair of left and right leg portions 63 (63L and 63R), a horizontal plate portion 62, a rear plate portion 64, a flange portion 66, and a first connection portion 67.

Leg portions 63 are provided to rise upward from floor member 40. Leg portion 63L and leg portion 63R are arranged to be spaced apart from each other in the left-right direction. Lower ends of leg portions 63 are fastened to floor member 40. The lower end of leg portion 63L is fastened to floor member 40 at a position close to left end 220 of floor member 40 relative to center position 101 of operator's seat 31 (center position 102 of cab 30) in the left-right direction. The lower end of leg portion 63R is fastened to floor member 40 at a position close to right end 230 of floor member 40 relative to center position 101 of operator's seat 31 (center position 102 of cab 30) in the left-right direction.

Horizontal plate portion 62 has a plate shape that is parallel to the horizontal direction. Horizontal plate portion 62 is provided at a position distant from and above floor member 40. Horizontal plate portion 62 connects an upper end of leg portion 63L and an upper end of leg portion 63R. Together with leg portion 63L and leg portion 63R, horizontal plate portion 62 forms a tunnel shape extending in the front-rear direction.

Rear plate portion 64 has a plate shape that is orthogonal to the front-rear direction. Rear plate portion 64 is provided at a rear end of support base 61. Rear plate portion 64 extends from leg portion 63R toward leg portion 63L in the left-right direction, and further extends to a position where rear plate portion 64 protrudes leftward from leg portion 63L. Rear plate portion 64 includes a second connection portion 65. Second connection portion 65 is provided at a left end of rear plate portion 64. Second connection portion 65 is provided at a position where rear plate portion 64 protrudes leftward from leg portion 63L.

Flange portion 66 extends rearward from a lower end of rear plate portion 64. When seen in the left-right direction, flange portion 66 has an L shape, together with rear plate portion 64. Flange portion 66 has a plate shape that is parallel to the horizontal direction, and is overlapped with floor member 40. Flange portion 66 is fastened to floor member 40.

First connection portion 67 has a plate shape that is parallel to the horizontal direction. First connection portion 67 faces flange portion 66 in the up-down direction. First connection portion 67 extends rearward from an upper end of rear plate portion 64 at a position where rear plate portion 64 protrudes leftward from leg portion 63L. First connection portion 67 is located to face pillar member 43L in the left-right direction.

Figure 11:
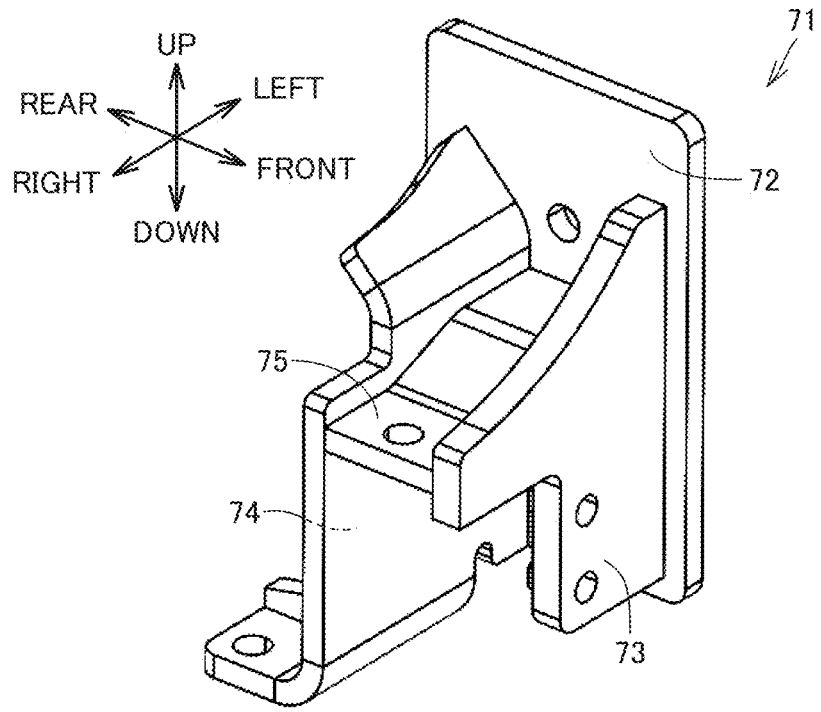
FIG. 11 is a perspective view showing a reinforcing member in FIGS. 7 and 8.
Figure 12:
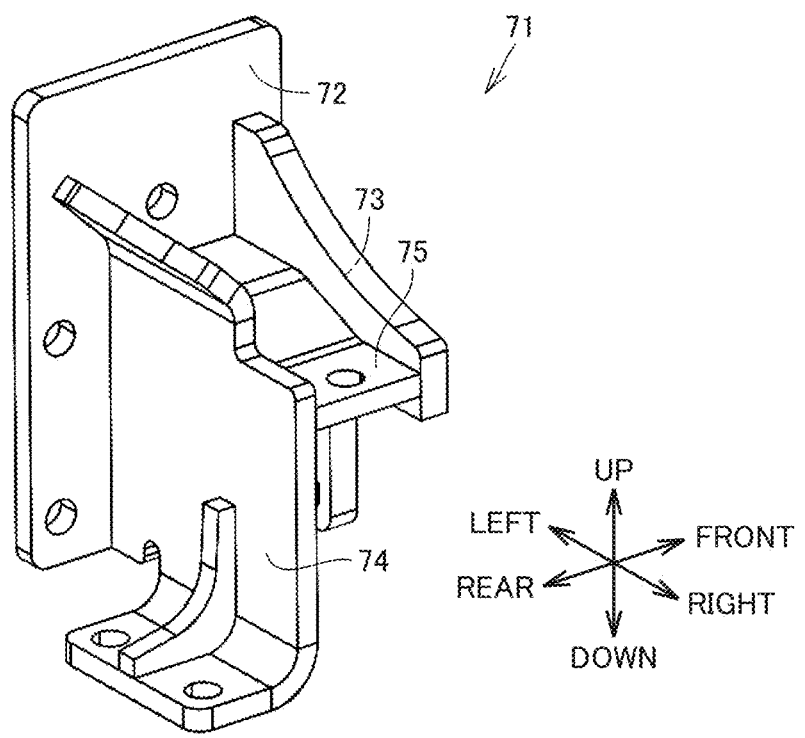
FIG. 12 is another perspective view showing the reinforcing member in FIGS. 7 and 8.

FIGS. 11 and 12 are perspective views showing the reinforcing member in FIGS. 7 and 8. As shown in FIGS. 7, 8, 11, and 12, reinforcing member 71 is formed of metal (e.g., a steel material). Reinforcing member 71 includes a base plate portion 72, an angle portion 74, a third connection portion 73, and a fourth connection portion 75.

Base plate portion 72 has a plate shape that is orthogonal to the left-right direction. Base plate portion 72 is overlapped with pillar member 43L in the left-right direction. Base plate portion 72 is fastened to pillar member 43L.

Angle portion 74 protrudes rightward from base plate portion 72. Angle portion 74 is provided to rise upward from floor member 40. A lower end of angle portion 74 is fastened to floor member 40.

Third connection portion 73 protrudes rightward from base plate portion 72. Third connection portion 73 has a plate shape that is orthogonal to the front-rear direction. Third connection portion 73 is provided at a position distant from and on the front side of angle portion 74. Third connection portion 73 is overlapped with second connection portion 65 of support base 61 in the front-rear direction. Third connection portion 73 is arranged on the rear side of second connection portion 65 of support base 61. Third connection portion 73 is fastened to second connection portion 65 of support base 61.

Fourth connection portion 75 protrudes rightward from base plate portion 72. Fourth connection portion 75 connects third connection portion 73 and angle portion 74 in the front-rear direction. Fourth connection portion 75 is provided at a position distant from and above floor member 40. Fourth connection portion 75 is arranged above first connection portion 67 of support base 61. First connection portion 67 of support base 61 is arranged on the front side of angle portion 74. Fourth connection portion 75 is fastened to first connection portion 67 of support base 61.

The shapes of support base 61 and reinforcing member 71 described above are provided as one example and are not particularly limited. A connection structure that connects reinforcing member 71 to support base 61 and pillar member 43L is not limited to fastening by a bolt, and may be welding, for example.

As shown in FIG. 6, floor member 40 includes a high rigidity portion 260 and a low rigidity portion 270. High rigidity portion 260 and low rigidity portion 270 are aligned in the left-right direction. High rigidity portion 260 has rigidity higher than that of low rigidity portion 270.

High rigidity portion 260 extends from left end 220 of floor member 40 and over a range in which reinforcing member 71 and support base 61 are provided in the left-right direction. Low rigidity portion 270 extends from right end 230 of floor member 40 and over a range in which reinforcing member 71 and support base 61 are not provided in the left-right direction. Low rigidity portion 270 extends from right end 230 of floor member 40 to a right end 69 of support base 61 in the left-right direction. Low rigidity portion 270 is exposed from reinforcing member 71 and support base 61.

As shown in FIGS. 5 and 6, hydraulic excavator 100 further includes a restriction member 81. Restriction member 81 is provided in gap 210 between floor member 40 and revolving frame 14 (rib portion 91B). Restriction member 81 protrudes from one of revolving frame 14 and floor member 40 toward the other of revolving frame 14 and floor member 40. Restriction member 81 is provided on floor member 40. Restriction member 81 protrudes from floor member 40 toward revolving frame 14.

Restriction member 81 has a pin shape that protrudes downward from floor member 40. A protrusion length H2 of restriction member 81 from floor member 40 is shorter than a length H1 of gap 210 in the up-down direction (H2<H1). Protrusion length H2 of restriction member 81 corresponds to a length in the up-down direction between floor member 40 and a protruding end of restriction member 81. Length H1 of gap 210 corresponds to a length in the up-down direction between floor member 40 and a top surface 91a of rib portion 91B. Restriction member 81 faces revolving frame 14 (rib portion 91B) in the up-down direction, with a gap therebetween.

The protrusion length of restriction member 81 from floor member 40 is shorter than a length of the gap between the protruding end of restriction member 81 and revolving frame 14 (H2<H1−H2). The protrusion length of restriction member 81 from floor member 40 may be equal to or longer than the length of the gap between the protruding end of restriction member 81 and revolving frame 14 (H2≥H1−H2).

Restriction member 81 is provided below support base 61 or reinforcing member 71. Restriction member 81 is provided below support base 61. Restriction member 81 is provided in high rigidity portion 260 of floor member 40.

Restriction member 81 has a rectangular parallelepiped shape. The shape of restriction member 81 is not particularly limited, and may be a cylindrical shape in which the up-down direction corresponds to an axial direction, for example.

Figure 13:
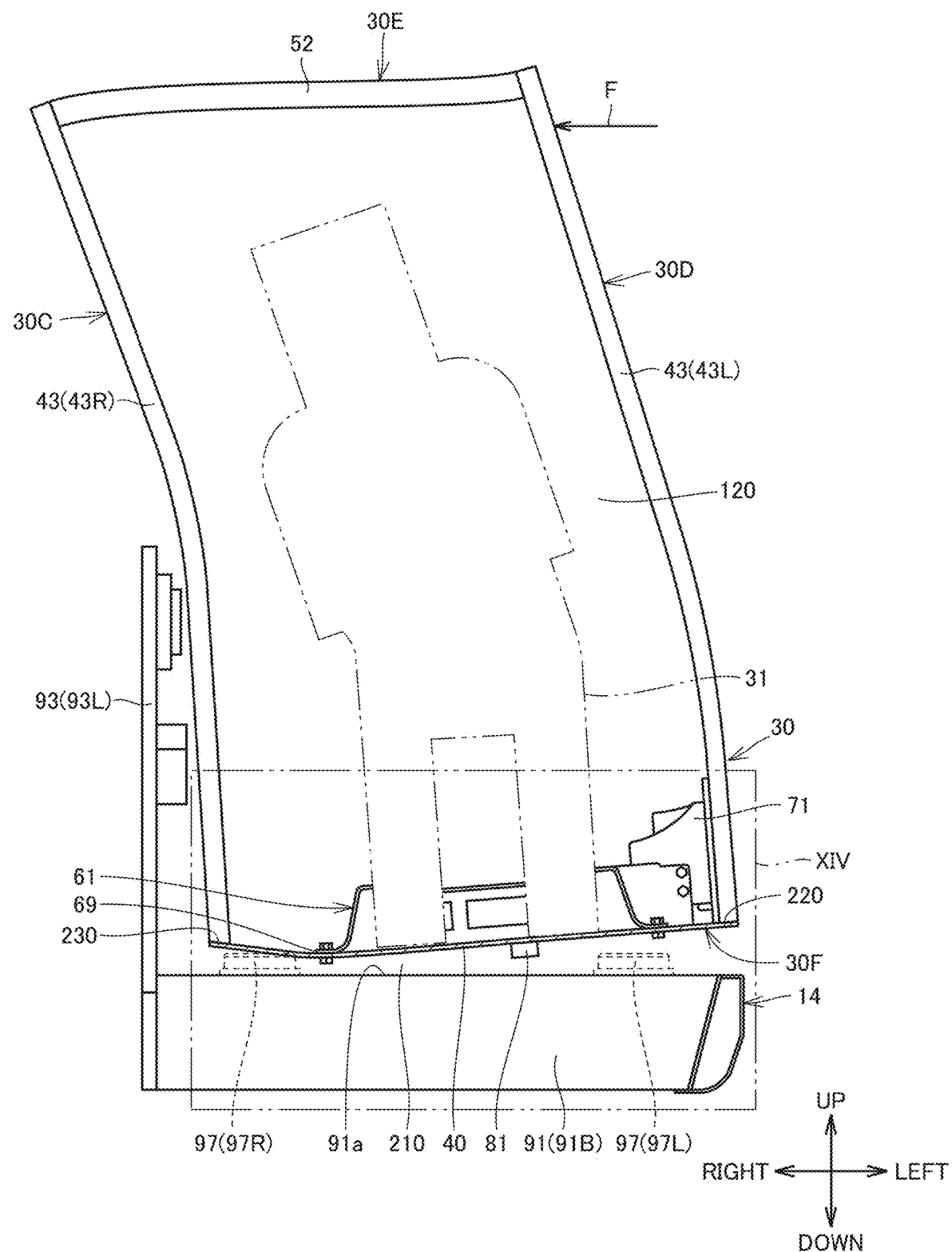
FIG. 13 is a cross-sectional view showing deformation of the cab when the hydraulic excavator falls down.
Figure 14:
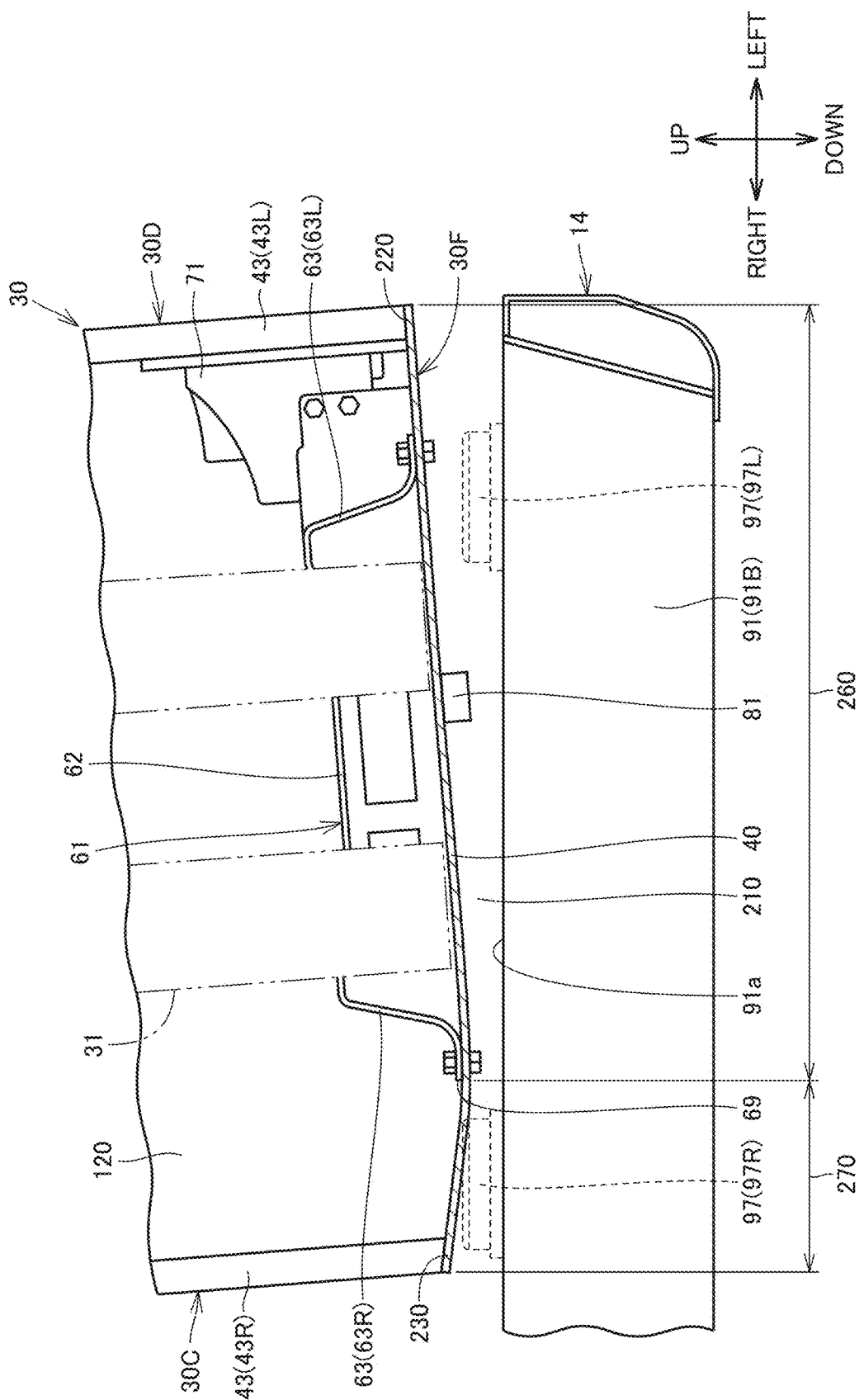
FIG. 14 is a cross-sectional view showing a range surrounded by a two-dot chain line XIV in FIG. 13 in an enlarged manner.

FIG. 13 is a cross-sectional view showing deformation of the cab when the hydraulic excavator falls down. FIG. 14 is a cross-sectional view showing a range surrounded by a two-dot chain line XIV in FIG. 13 in an enlarged manner.

As shown in FIGS. 13 and 14, when hydraulic excavator 100 falls down, external force in the horizontal direction (force indicated by an arrow F in FIG. 13) is applied to left surface 30D of cab 30. In such a case, even when cab 30 becomes deformed, it is required to prevent excessive deformation of cab 30 and secure a sufficient distance between left surface 30D and the operator in cab 30.

In hydraulic excavator 100, reinforcing member 71 connected to pillar member 43L and support base 61 is provided on floor member 40. With such a configuration, pillar member 43L, and reinforcing member 71 and support base 61 on floor member 40 together receive the external force in the horizontal direction applied to left surface 30D, and thus, bending of pillar member 43L at the connection portion at left end 220 of floor member 40 can be suppressed. Therefore, it is possible to suppress such deformation that left surface 30D falls down toward the operator seated on operator's seat 31.

In addition, floor member 40 includes high rigidity portion 260 having higher rigidity, which extends from left end 220 of floor member 40 and over the range in the left-right direction in which reinforcing member 71 and support base 61 are provided. In such a configuration, when the external force in the horizontal direction is applied to left surface 30D, floor member 40 becomes deformed such that high rigidity portion 260 is lifted to a higher level with decreasing distance from left end 220 of floor member 40 in the left-right direction. More specifically, floor member 40 becomes deformed such that floor member 40 bends downward near a boundary between high rigidity portion 260 and low rigidity portion 270, and high rigidity portion 260 is lifted to a higher level with decreasing distance from left end 220 of floor member 40 in the left-right direction. As a result, the operator seated on operator's seat 31 assumes a posture with the lowered right shoulder, which makes it possible to secure a sufficient distance between left surface 30D and the operator.

Figure 15:
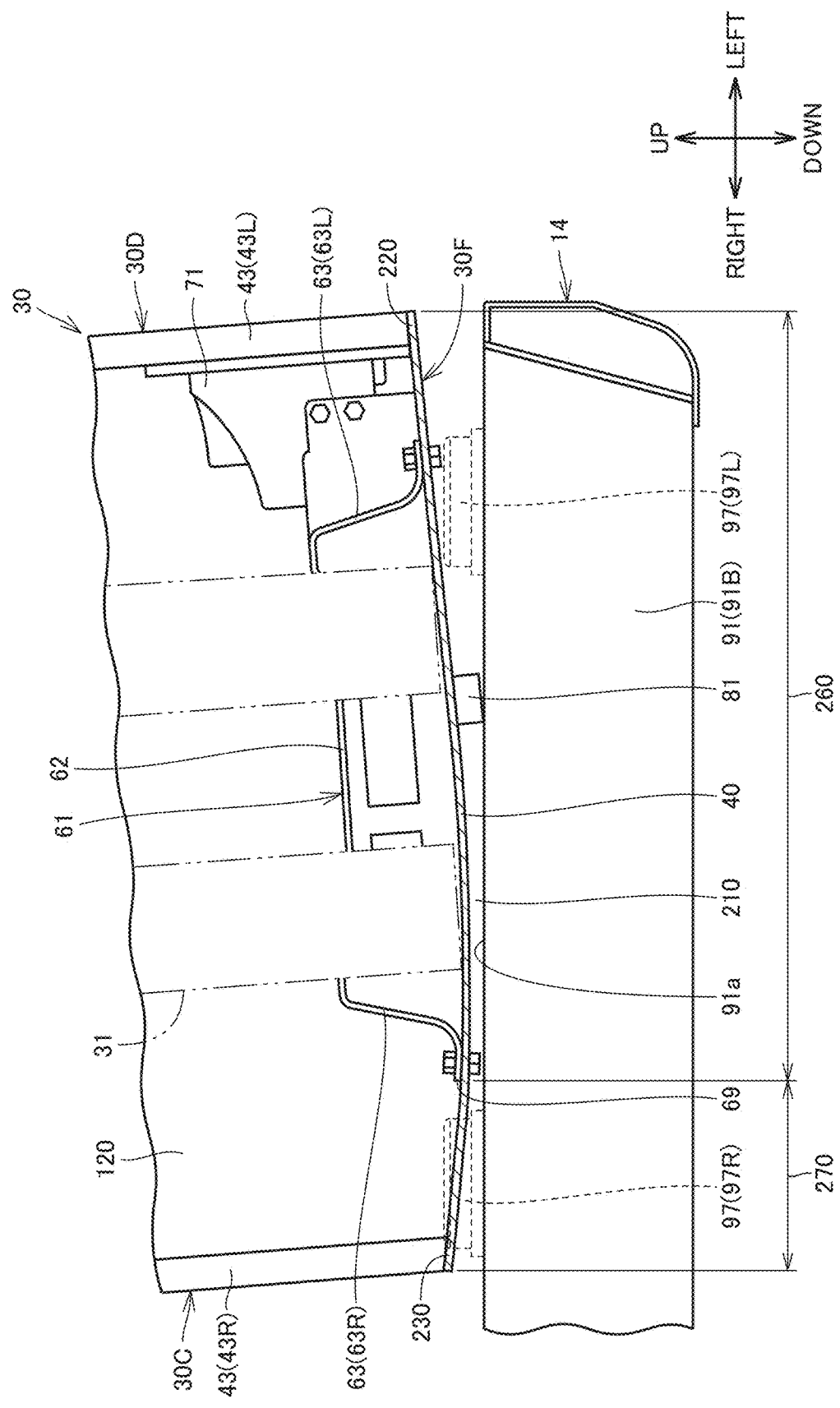
FIG. 15 is a cross-sectional view showing a state in which the cab is further deformed when the hydraulic excavator falls down.

FIG. 15 is a cross-sectional view showing a state in which the cab is further deformed when the hydraulic excavator falls down.

As shown in FIG. 15, when floor member 40 is further deformed, a downward component of the external force applied to left surface 30D increases, which may cause a phenomenon in which high rigidity portion 260 as a whole sinks downward.

In order to deal with this, in hydraulic excavator 100, restriction member 81 protruding from floor member 40 toward revolving frame 14 is provided in gap 210 between floor member 40 and revolving frame 14. Since the protrusion length of restriction member 81 from floor member 40 is shorter than the length of gap 210 in the up-down direction, restriction member 81 abuts against revolving frame 14 as the deformation of floor member 40 progresses. Since restriction member 81 is provided below support base 61 that forms high rigidity portion 260, restriction member 81 can suppress the phenomenon in which high rigidity portion 260 sinks downward, when restriction member 81 abuts against revolving frame 14. As a result, the operator's posture with the lowered right shoulder is maintained, which makes it possible to continue to secure a sufficient distance between left surface 30D and the operator.

For the above-described reason, it is possible to prevent excessive deformation of cab 30 and secure a sufficient distance between cab 30 and the operator when hydraulic excavator 100 falls down.

As shown in FIG. 13, in hydraulic excavator 100, a highly rigid rollover protective structure (ROPS) is implemented by pillar members 43 (43L and 43R) and beam member 52 that form a gate shape around living space 120 for the operator.

This makes it possible to more effectively suppress such deformation that left surface 30D falls down toward the operator seated on operator's seat 31 when hydraulic excavator 100 falls down.

Figure 16:
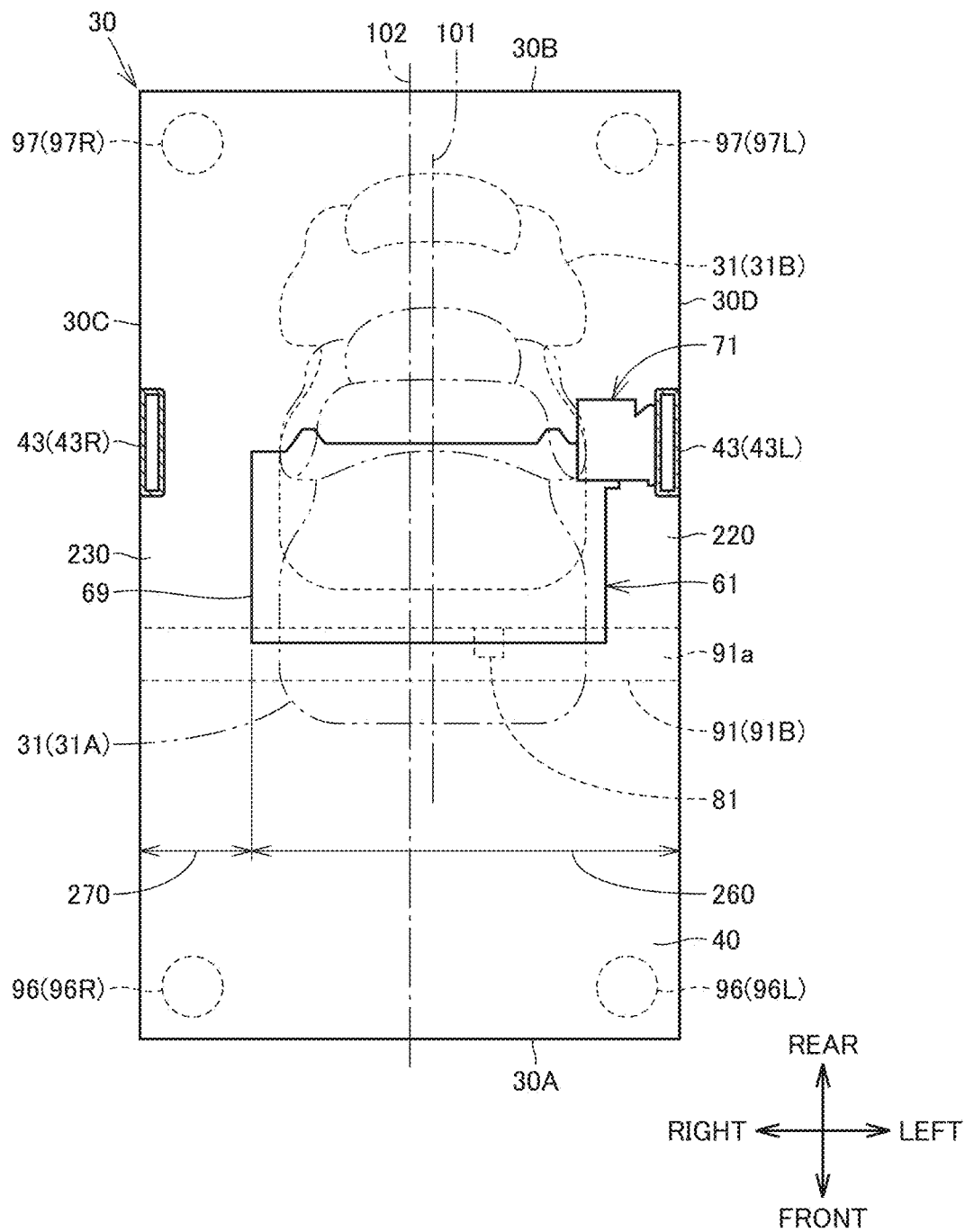
FIG. 16 is a top view showing the interior of the cab.

FIG. 16 is a top view showing the interior of the cab. As shown in FIG. 16, operator's seat 31 can slide in the front-rear direction between a front position indicated by an operator's seat 31A and a rear position indicated by an operator's seat 31B.

Pillar members 43 (43L and 43R) are located on the lateral sides of operator's seat 31 in an entire range in the front-rear direction in which operator's seat 31 slides. However, the present disclosure is not limited thereto, and pillar members 43 (43L and 43R) may be located on the lateral sides of operator's seat 31 in a part of the range in the front-rear direction in which operator's seat 31 slides.

As shown in FIGS. 6, 15 and 16, restriction member 81 is provided between center position 101 of operator's seat 31 and left end 220 of floor member 40 in the left-right direction.

According to such a configuration, restriction member 81 abuts against revolving frame 14 at a position close to left end 220 of floor member 40 relative to center position 101 of operator's seat 31 in the left-right direction. In this case, when restriction member 81 abuts against revolving frame 14, the phenomenon in which high rigidity portion 260 sinks downward is suppressed under the left half body (under the left foot) of the operator, and thus, the operator's posture with the lowered right shoulder is easily maintained. This makes it possible to further secure a sufficient distance between left surface 30D and the operator when hydraulic excavator 100 falls down.

As shown in FIG. 16, restriction member 81 is provided between center position 102 of cab 30 and left end 220 of floor member 40 in the left-right direction.

Front damper 96L and rear damper 97L are provided in high rigidity portion 260 in the left-right direction. Front damper 96R and rear damper 97R are provided in low rigidity portion 270 in the left-right direction. Restriction member 81 is provided between front damper 96L and front damper 96R in the left-right direction. Restriction member 81 is provided between rear damper 97L and rear damper 97R in the left-right direction. Restriction member 81 is provided between front and rear dampers 96L and 97L and center position 101 of operator's seat 31 (center position 102 of cab 30) in the left-right direction.

Restriction member 81 is provided on the front side of pillar members 43 (43L and 43R). Restriction member 81 may be provided at a position aligned with pillar members 43 (43L and 43R) in the front-rear direction, or may be provided on the rear side of pillar members 43 (43L and 43R) in the front-rear direction. Restriction member 81 is provided on the front side of reinforcing member 71. Restriction member 81 may be provided at a position aligned with reinforcing member 71 in the front-rear direction, or may be provided on the rear side of reinforcing member 71.

Restriction member 81 is provided between front dampers 96 (96L and 96R) and rear dampers 97 (97L and 97R) in the front-rear direction.

In a top view, at least a part of restriction member 81 overlaps with support base 61. A part of restriction member 81 overlaps with support base 61.

According to such a configuration, the rigidity of floor member 40 is increased by support base 61 at the position where restriction member 81 is provided. Thus, deformation of floor member 40 caused by an impact when restriction member 81 abuts against revolving frame 14 can be suppressed. As a result, the phenomenon in which high rigidity portion 260 sinks downward can be suppressed more effectively.

In a top view, at least a part of restriction member 81 overlaps with rib portion 91B. The whole of restriction member 81 overlaps with rib portion 91B.

According to such a configuration, rib portion 91B having high rigidity is provided at the position where restriction member 81 abuts against revolving frame 14. Thus, deformation of revolving frame 14 caused by an impact when restriction member 81 abuts against revolving frame 14 can be suppressed. As a result, the phenomenon in which high rigidity portion 260 sinks downward can be suppressed more effectively.

In a top view, restriction member 81 overlaps with operator's seat 31 in a part of the range in the front-rear direction in which operator's seat 31 slides. Restriction member 81 may overlap with operator's seat 31 in the entire range in the front-rear direction in which operator's seat 31 slides.

The configuration and effect of hydraulic excavator 100 according to the present embodiment described above will be summarized.

Hydraulic excavator 100 as a work vehicle according to the present disclosure includes: revolving frame 104; and cab 30. Cab 30 is provided on revolving frame 14. Cab 30 includes: floor member 40; support base 61; pillar member 43L as a first pillar member; and reinforcing member 71. Floor member 40 faces revolving frame 14 in an up-down direction, with gap 210 therebetween. Support base 61 is provided on floor member 40. Support base 61 supports operator's seat 31. Pillar member 43L extends in the up-down direction. Pillar member 43L is connected to left end 220 as one end of floor member 40 in a left-right direction. Reinforcing member 71 is provided on floor member 40. Reinforcing member 71 is connected to pillar member 43L and support base 61. Hydraulic excavator 100 further includes restriction member 81. Restriction member 81 is provided in gap 210. Restriction member 81 protrudes from one (floor member 40) of revolving frame 14 and floor member 40 toward the other (revolving frame 14) of revolving frame 14 and floor member 40. Restriction member 81 has a protrusion length shorter than a length of gap 210 in the up-down direction. Restriction member 81 is provided below support base 61 or reinforcing member 71 (support base 61).

According to such a configuration, reinforcing member 71 connected to pillar member 43L and support base 61 is provided on floor member 40, and thus, the connection strength of pillar member 43L at left end 220 of floor member 40 can be increased. This makes it possible to suppress such deformation that cab 30 falls down toward the operator seated on operator's seat 31 when excessive external force in the horizontal direction is applied to pillar member 43L.

When excessive external force in the horizontal direction is applied to pillar member 43L, floor member 40 becomes deformed such that high rigidity portion 260 is lifted to a higher level with decreasing distance from left end 220 of floor member 40 in the left-right direction, high rigidity portion 260 being a portion extending from left end 220 of floor member 40 and over the range in the left-right direction in which reinforcing member 71 and support base 61 are provided. As a result, the operator seated on operator's seat 31 assumes the posture with the lowered right shoulder, and thus, the operator can be kept away from cab 30 that deforms to fall down toward the operator.

When the deformation of floor member 40 progresses, the phenomenon in which high rigidity portion 260 as a whole sinks downward may occur. In order to deal with this, restriction member 81 provided below support base 61 or reinforcing member 71 abuts against revolving frame 14, thereby suppressing the phenomenon in which high rigidity portion 260 sinks downward. As a result, the operator's posture with the lowered right shoulder is maintained. For the above-described reason, it is possible to prevent excessive deformation of cab 30 and secure a sufficient distance between cab 30 and the operator.

Restriction member 81 is provided between center position 101 of operator's seat 31 and left end 220 of floor member 40 in the left-right direction.

According to such a configuration, restriction member 81 abuts against revolving frame 14 at the position close to left end 220 of floor member 40 relative to center position 101 of operator's seat 31 in the left-right direction. In this case, when restriction member 81 abuts against revolving frame 14, the phenomenon in which high rigidity portion 260 sinks downward is suppressed under the left half body of the operator, and thus, the operator's posture with the lowered right shoulder is easily maintained.

In a top view, at least a part of restriction member 81 overlaps with support base 61.

According to such a configuration, the rigidity of floor member 40 is increased by support base 61 at the position where restriction member 81 is provided. Therefore, when restriction member 81 abuts against revolving frame 14, the phenomenon in which high rigidity portion 260 sinks downward can be suppressed more effectively.

Revolving frame 14 includes bottom plate 95, and rib portion 91B. Rib portion 91B is erected on bottom plate 95. Rib portion 91B extends in the left-right direction. In a top view, at least a part of restriction member 81 overlaps with rib portion 91B.

According to such a configuration, reinforcing rib portion 91B erected on bottom plate 95 is provided at the position where restriction member 81 abuts against revolving frame 14. Therefore, when restriction member 81 abuts against revolving frame 14 (rib portion 91B), the phenomenon in which high rigidity portion 260 sinks downward can be suppressed more effectively.

Cab 30 further includes: pillar member 43R as a second pillar member; and beam member 52. Pillar member 43R extends in the up-down direction. Pillar member 43R is connected to right end 230 as the other end of floor member 40 in the left-right direction. Beam member 52 extends in the left-right direction. Beam member 52 is connected to an upper end of pillar member 43L and an upper end of pillar member 43R.

According to such a configuration, pillar member 43L, beam member 52 and pillar member 43R form a gate shape around living space 120 for the operator. This makes it possible to more effectively suppress such deformation that cab 30 falls down toward the operator when excessive external force is applied to cab 30.

Although the configuration in which restriction member 81 is provided on floor member 40 has been described in the present embodiment, the present disclosure is not limited thereto. Restriction member 81 may be provided on revolving frame 14 (rib portion 91B).

In addition, the cab in the present disclosure is applicable not only to the hydraulic excavator but also to various work vehicles such as a crane.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 11 vehicular body; 12 work implement; 13 revolving unit; 14 revolving frame; 15 traveling unit; 15Cr crawler belt; 15M traveling motor; 16 boom; 17 arm; 18 bucket; 19 engine compartment; 20A, 20B boom cylinder; 21 arm cylinder; 22 bucket cylinder; 23 boom pin; 24 arm pin; 25 bucket pin; 26 center of swing; 30 cab; 30A front surface; 30B rear surface; 30C right surface; 30D left surface; 30E top surface; 30F bottom surface; 31, 31A, 31B operator's seat; 32 door member; 40 floor member; 42, 42L, 42R, 43, 43L, 43R, 44, 44L, 44R pillar member; 45 ceiling member; 46 front transparent member; 47 lower transparent member; 48 lateral transparent member; 51, 52, 53 beam member; 54, 54L, 54R, 55, 55L, 55R girder member; 61 support base; 62 horizontal plate portion; 63, 63L, 63R leg portion; 64 rear plate portion; 65 second connection portion; 66 flange portion; 67 first connection portion; 69 right end; 71 reinforcing member; 72 base plate portion; 73 third connection portion; 74 angle portion; 75 fourth connection portion; 81 restriction member; 91, 91A, 91B, 91C rib portion; 91a top surface; 92 damper attachment hole; 93, 93L, 93R vertical plate; 94 pin hole; 95 bottom plate; 96, 96L, 96R front damper; 97, 97L, 97R rear damper; 100 hydraulic excavator; 101, 102 center position; 120 living space; 210 gap; 220 left end; 230 right end; 260 high rigidity portion; 270 low rigidity portion.

The invention claimed is:
1. A work vehicle comprising:
a revolving frame;
a cab provided on the revolving frame; and
a work implement attached on the revolving frame;
the cab including:
 a floor member that faces the revolving frame in an up-down direction, with a gap therebetween;
 a support base provided on the floor member and supporting an operator's seat;
 a first pillar member extending in the up-down direction and connected to one end of the floor member in a left-right direction; and
 a reinforcing member provided on the floor member and connected to the first pillar member and the support base, and
a restriction member provided in the gap and protruding from one of the revolving frame and the floor member toward the other of the revolving frame and the floor member, wherein
the restriction member has a protrusion length shorter than a length of the gap in the up-down direction, and is provided below the support base or the reinforcing member,
the cab is formed of a box having a first side surface facing the work implement in the left-right direction and a second side surface facing a side opposite to the first side surface in the left-right direction,
the first pillar member is provided on the second side surface, and
the restriction member is provided between a center position of the operator's seat in the left-right direction and the one end portion of the floor member.

2. The work vehicle according to claim 1, wherein
in a top view, at least a part of the restriction member overlaps with the support base.

3. The work vehicle according to claim 1, wherein
the revolving frame includes a bottom plate, and a rib portion erected on the bottom plate and extending in the left-right direction, and
in a top view, at least a part of the restriction member overlaps with the rib portion.

4. The work vehicle according to claim 1, wherein
the cab further includes:
a second pillar member extending in the up-down direction and connected to the other end of the floor member in the left-right direction; and
a beam member extending in the left-right direction and connected to an upper end of the first pillar member and an upper end of the second pillar member.

* * * * *